United States Patent [19]

Pfefferle

[11] Patent Number: 4,918,915
[45] Date of Patent: Apr. 24, 1990

[54] METHOD FOR CLEAN INCINERATION OF WASTES

[76] Inventor: William C. Pfefferle, 51 Woodland Dr., Middletown, N.J. 07748

[21] Appl. No.: 169,595

[22] Filed: Mar. 17, 1988

Related U.S. Application Data

[63] Continuation-in-part of Ser. No. 98,785, Sep. 21, 1987, abandoned.

[51] Int. Cl.⁵ .................................................. F02C 3/04
[52] U.S. Cl. .................................. 60/39.02; 60/39.12; 60/39.464; 60/723
[58] Field of Search .................... 60/39.02, 39.12, 723, 60/39.822, 301, 39.52, 39.464; 431/7

[56] References Cited

U.S. PATENT DOCUMENTS

| | | | |
|---|---|---|---|
| 3,086,362 | 4/1963 | Foster-Pegg | 60/39.12 |
| 3,759,036 | 9/1973 | White | 60/39.12 |
| 3,866,411 | 2/1975 | Marion et al. | 60/39.52 |
| 3,928,961 | 12/1975 | Pfefferle | 60/39.06 |
| 3,940,923 | 3/1976 | Pfefferle | 60/723 |
| 3,975,900 | 8/1976 | Pfefferle | 60/723 |
| 4,019,316 | 4/1977 | Pfefferle | 60/723 |
| 4,058,974 | 11/1977 | Pfenninger | 60/39.12 |
| 4,065,917 | 1/1978 | Pfefferle | 60/723 |
| 4,095,419 | 6/1978 | Pfenninger | 60/39.12 |
| 4,732,092 | 3/1988 | Gould | 60/39.12 |

Primary Examiner—Donald E. Stout
Attorney, Agent, or Firm—Kane, Dalsimer, Sullivan, Kurucz, Levy, Eisele & Richard

[57] ABSTRACT

The present invention provides a method for the destruction of hazardous carbonaceous wastes comprising solids which comprises the steps of (a) gasifying said wastes and producing an intimate admixture of the gaseous products of said gasification with air, said admixture containing at least a stoichiometric amount of air, (b) passing said admixture to a plug flow combustion zone, and (c) effecting sustained and essentially complete combustion of said admixture under essentially adiabatic conditions to destroy said gaseous products and to form a combustion effluent of high thermal energy; said combustion being characterized by said admixture having an adiabatic flame temperature such that that actual flame temperature in the combustion zone is greater than about 1350 K.

5 Claims, 3 Drawing Sheets

METHOD FOR CLEAN INCINERATION OF WASTES

BACKGROUND OF THE INVENTION

CROSS REFERENCE TO RELATED APPLICATION

This application is a continuation-in-part of my copending U.S. patent application Ser. No. 098,785 filed on Sept. 21, 1987, now allowed.

FIELD OF THE INVENTION

This invention relates to a method and apparatus for the destruction of carbonaceous wastes. More specifically, this invention relates to plug flow combustion of gases produced by gasification of carbonaceous wastes.

In one still more specific aspect, this invention relates to more efficient incineration of solid wastes without significant pollution of the environment with halogenated hydrocarbons or products of incomplete combustion.

BRIEF DESCRIPTION OF THE PRIOR ART

The disposal of solid and liquid hazardous/toxic wastes and fumes thereof is a pressing modern day problem. In particular, disposal of wastes such as domestic garbage is a particularly vexing problem, conventional incineration resulting in significant emissions of dioxins and other toxic partial oxidation products. Even with recycling and other efforts to reduce the amount of wastes produced, the amounts of such hazardous/toxic wastes to be disposed of will likely increase. Thus, the safe disposal of hazardous wastes is a major problem yet to be satisfactorily deal with. In addition to solid wastes, liquid wastes are also a problem.

Present technologies, typically based on incineration, are not only costly but even more important are not completely reliable and typically do not achieve complete destruction, leading to proposals for burning at sea. Combustion of halogenated hydrocarbons is especially a problem since such compounds tend to inhibit combustion and reduce flame speeds. Thus, with highly toxic compounds such as polychlorinated biphenyl's (PCB's) or dioxins combustion can result in especially hazardous emissions. For certain highly toxic compounds, 99.9999 percent or better conversion efficiency is currently required by the EPA. Solid wastes containing such compounds are a special problem. However, emissions of the products of incomplete combustion (PIC's) are currently unregulated and represent at least a potentially serious health problem inasmuch as PIC's emissions from conventional incinerators often consist of dioxins and other toxic compounds.

Solid Wastes

Conventional thermal incinerators for hazardous or toxic organic solids, whether utilizing conventional moving bed or fluidized bed combustors, require relatively long average residence times to achieve acceptably high destruction efficiencies, leading to high capital and operating costs. In the first place, combustion of solids typically leads to pyrolysis, resulting in formation of partial oxidation products and pyrolysis volatiles (PIC's) which must then also be combusted. Secondly, gas phase combustion of the PIC's typically requires a high degree of turbulent backmixing with air to maintain combustion. It is believed that the long mean residence time required for high conversion stems from the fact that extensive backmixing results in a wide range of fluid residence times. Thus, even with a relatively long mean residence time some flow elements pass through very quickly and essentially uncombusted. Moreover, carbonization can entrap organics, as can soot formation from auxilliary fuel burners. Truly effective incineration requires the complete destruction not only of the original wastes but of the resulting PIC's and soot entrapped organics.

Flame combustors require substantial backmixing to achieve flame stability since laminar flame speeds are typically too low to permit high heat release rates without backmixing. In the fluidized bed systems, which operate much like stirred tanks, combustion is stabilized primarily by backmixing and the gas residence time is typically much shorter than solids residence time. PIC's, which are formed throughout the stirred tank, can be emitted almost as soon as formed. In moving bed type incinerators, whether rotary kiln or moving grate, combustion may be stabilized by overfiring using a conventional flame combustor. With such kilns, residence time can be limited by the time required to burn out large solid objects. Therefore size reduction of the feed is often desireable even though such kilns, unlike fluidized bed incinerators, can be designed to handle almost any size object.

The relatively long residence times required by present technologies lead to a need for relatively large incinerators involving high capital costs and significant heat losses. The large capital investment required can be justified only by large waste volumes. Consequently, on-site incinerators are economic only for the largest waste producers leading to the need for collection and transportation of wastes, often through areas of high population density, with the near certainty of spills and even major catastrophe. On the other hand, municipal incinerators, which typically must be located near population centers, face opposition because of the pollution emitted. Moreover, although incinerators are designed for better than 99.99 percent conversions, flame-outs of conventional combustors are not uncommon and in incinerators could be disasterous. Even without upsets there has been concern about unacceptable emissions of dioxins and other PIC's from incinerators. This inherent unreliability of conventional incinerators has led to the building of special incinerator ships for burning toxic wastes at sea, and coastal cities are simply dumping garbage at sea.

In contrast to the foregoing, the present invention provides for the safe disposal of solid wastes by stable combustion of wastes with 99.99 percent or better destruction efficiency including PIC's. It has now been found that by passing the gaseous effluent of a conventional type solids incinerator through a plug flow combustor, not only can emissions of PIC's be practically eliminated but the size and thus the cost of the incineration system reduced. Because the plug flow combustors of the present invention are so efficient, the solids incinerator need only gasify the wastes. Residence times in the plug flow combustor can be less than 50 milliseconds for 99.9999% conversion, i.e. much lower than for a conventional secondary combustor. Accordingly, in a system of the present invention it is advantageous to size the solids incinerator primarily for gasification of solids rather than for complete combustion, thus reducing size and cost.

The method of the present invention thus makes possible reliable, cost effective, destruction of both solid carbonaceous wastes and hazardous/toxic waste liquids.

SUMMARY OF THE INVENTION

Definition of Terms

The term "carbonaceous waste" as used herein refers not only to carbon containing compounds such as hydrocarbons, dioxins, alcohols, ketones, aldehydes, ethers, organic acids, halogenated forms of the foregoing organic compounds and the like but to any materials containing or composed of organic matter, such as municipal garbage or hazardous organics contaminated earth.

The terms "fume" and "fumes" in the present invention refers to admixtures of organic vapors with air or inert gases in too low a concentration to produce a flame, and typically in concentrations as low as one to several hundred parts per million by volume. Although the invention is described herein in terms of air as the oxidant, it is well understood that oxygen is the required element to support combustion. The term "air" is used herein to refer not only to atmospheric air but to oxygen containing non-fuel components of admixtures, including water added to enhance combustion.

As used in the present invention, the terms "gasification" and "gasify" mean the conversion to gaseous form of at least a portion of the organic content of a carbonaceous waste whether by oxidation, pyrolysis, volatilization, or any combination thereof.

The term "instantaneous auto-ignition temperature" for a fuel-air admixture as used herein is defined to mean that temperature at which the auto-ignition lag of the fuel-air mixture entering the combustion zone is negligible relative to the residence time in the combustion zone of the mixture undergoing combustion.

The term "fuel" includes the carbonaceous wastes to be destroyed, including fumes, gasification products, and any supplemental fuel required to obtain fuel-air admixtures with sufficiently high adiabatic flame temperatures. With wastes of sufficient heating value the waste stream can be the sole fuel used.

The term "essentially complete combustion" is used to denote a level of conversion exceeding the requirements for disposal of the materials to be destroyed. Under 40CFR 264.343, 99.99% destruction and removal efficiency (DRE) is specified for toxic materials. In addition, EPA waste codes F020-F028 specify a DRE of 99.9999% for chlorinated dioxins or similar compounds (Federal Register, Jan. 14, 1985). However, the DRE requirement applies only to the original materials present. Emissions of PIC's are unregulated. For fumes the requirement may be stated in terms of concentration of the fume in the effluent, typically less than 0.1 ppm but often as low as one to five parts per billion. These conversion levels are well beyond those required for primary fuel combustion in boilers and gas turbines.

In the present invention, the "stoichiometric amount of air" means the amount of air required to provide sufficient oxygen for complete combustion of the fuel to carbon dioxide and water.

The term "plug flow" as used herein should be understood to mean flow systems with a narrow gas residence time distribution without significant backmixing in the plug flow combustion zone. In other words the minimum gas residence time is close to the mean gas residence time.

Detailed Description of the Invention

In accordance with the present invention, hazardous waste streams are destroyed and the heating value recovered by gasification followed by plug flow combustion of the resulting gases in admixture with air, at a temperature in excess of 1350K and at a velocity in excess of the laminar flame velocity of the fuels used. Typically, wastes are gasified by combustion in a solids incinerator resulting in pyrolysis and partial oxidation products being formed. A preferred method of stabilizing plug flow combustion is by use of a catalyst as in the method of my U.S. Pat. No. 3,928,961, incorporated herein by reference thereto. Other methods, described in co-pending application Ser. No. 098,785 filed on Sept. 21, 1987and now allowed, include plasma jet stabilization, thermal stabilization by contact with a hot wall or stabilization by heating at least a portion of the admixture of fuel and air to a temperature above or close to the instantaneous auto-ignition temperature as by mixing with hot combustion products, as in a venturi mixing zone, prior to the plug flow reaction zone. As noted above, at the instantaneous auto-ignition temperature, auto-ignition delay is negligible and combustion proceeds rapidly. Using a venturi to recycle hot combustion products is particularly effective with high water content fuels. For complete combustion of the fuel at least a stoichiometric amount of air is required. At least twice the stoichiometric amount of air is preferred. In gas turbine applications the excess air may be greater than 400 percent.

The catalytically stabilized thermal (CST) combustor of the aforementioned patent is especially well suited for the plug flow combustor of the present invention since it represents a unique approach to combustion that incorporates the best features of thermal flame combustors and heterogeneous catalytic surface oxidation systems. Moreover, even fuel-air mixtures well below the normal lean flammability limits are readily burned. In the catalytically stabilized thermal combustor, it has been shown that catalytic surface reactions generate heat and gas phase reactive intermediates which promote rapid gas phase combustion. The result is an efficient, high heat release rate combustor which is remarkably insensitive to flow surges. As a primary fuel combustor, the catalytically stabilized thermal combustor typically achieves conversions well above 99.9 percent with no soot formation, far better than the typical flame combustor. Using the methods of the present invention high conversion efficiencies can be reliably obtained and are essential for the effective destruction of toxic wastes. It has been found that the better than 99.9999 percent conversion of combustible organics required for a PCB waste oil burning system can be obtained in a catalytically stabilized combustor provided radial heat losses are controlled such that the coolest reaction channels are maintained above a predetermined temperature, typically above about 1300K and more preferrably above 1350K. This is to ensure that the actual flame temperature reached in these coolest channels is at least as high as 1350K. The adiabatic flame temperature of the incoming fuel-air admixture is maintained at a value sufficiently higher than 1350K to maintain the desired actual flame temperature. Similarly high conversions can be obtained with hot gas or plasma-jet stabilized and thermally stabilized plug flow reactor combustion systems provided the reactor internal wall surfaces are maintained at a sufficiently high temperature to avoid quenching of gas phase combustion at the wall. The adiabatic flame temperature of the incoming admixture of fuel and air preferrably is high enough that the actual flame temperature at completion of combustion is at least 1350K even near the combustor wall.

Because of the high conversion efficiency, smaller size and lower cost of incinerators of the present invention, on-site combustion of most hazardous organics is now economically feasible. Moreover, incineration systems according to the present invention are well suited for powering gas turbines and thus for recovering energy in the form of work. Gas turbines employed with systems of the present invention for destruction of hazardous materials can power an electrical generator, providing a source of electrical power and thus reducing the cost of destroying hazardous wastes. Moreover fumes can make up part of the incinerator combustion air. If such is the case, it is advantageous to use a source of clean compressed air for turbine cooling air rather than part of the combustion air to avoid by-passing such fumes around the incineration zones. Alternately, an uncooled turbine or use of an alternate cooling fluid such as steam may be employed.

Inasmuch as wastes are typically of varying and indeterminate composition (and heat of combustion), particularly in the case of fuel-water emulsions and municipal wastes, it may be necessary for reliable operation to burn the waste along with another fuel, which itself can be a hazardous waste. In the present invention, solid wastes are gasified and destroyed by combustion in a conventional solids incinerator and the combustion products passed to a plug flow combustion zone for essentially complete destruction of the products of incomplete combustion (PIC's) and unburned waste volatiles. Thus, a much shorter gas residence time is required in the solids incinerator, reducing its size and cost, and dangerous emissions of PIC's are significantly reduced. Inorganic contaminants in the combustion effluent may be removed by either hot or cold scrubbing using conventional means. The present invention is further described in connection with the following drawings:

Figure 1:
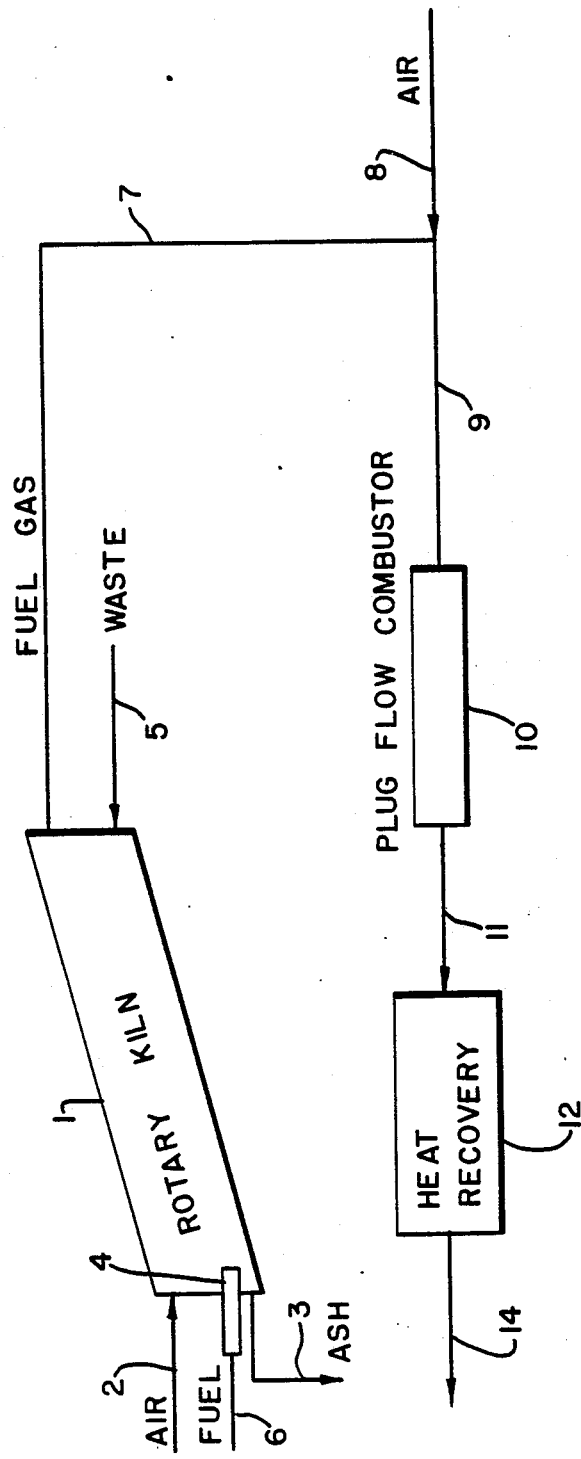
FIG. 1 is a schematic representation of a rotary kiln type solids waste incinerator employing a catalytically stabilized plug flow thermal combustor according to the method of the present invention.
Figure 2:
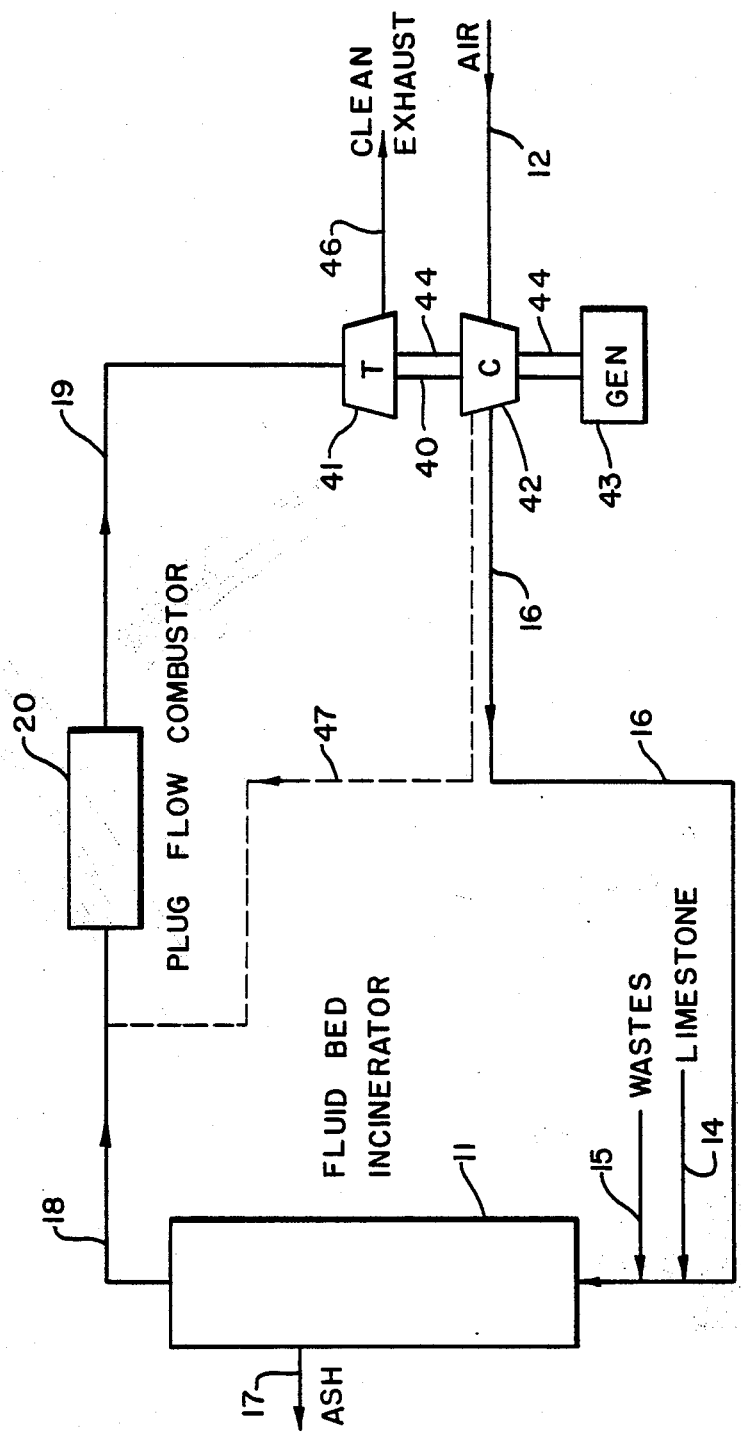
FIG. 2 is a schematic representation of a gas turbine solids waste incineration system suitable for destruction of chlorinated wasted and employing a fluidized bed incinerator combined with a plug flow combustor according to the method of the present invention.
Figure 3:
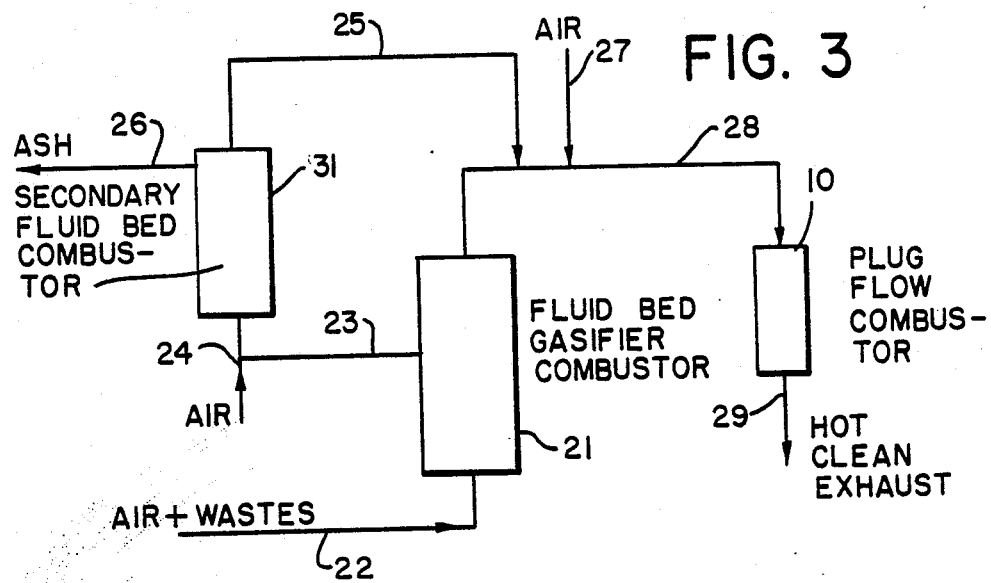
FIG. 3 is a schematic representation of a dual bed fluidized combustion system according to the present invention.
Figure 5:
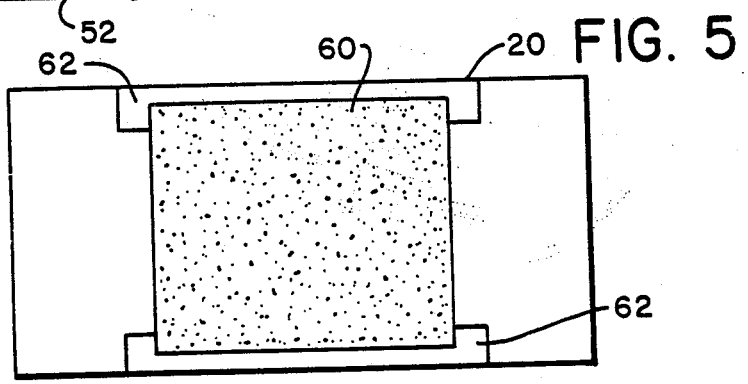

FIG. 5 is a cross-sectional side elevation, enlarged, of the plug flow combustor shown in FIGS. 1-3, inclusive. With reference to FIG. 1, waste is fed to rotary kiln 1 via line 5 and combustion air at the opposite end via line 2. Ash exits via line 3. Thus, air flows through the kiln counter-current to the flow of solids permiting more efficient burn-out of residual carbon from the ash and assuring that the ash is free of toxic volatiles. Fuel is supplied by line 6 to burner 4 for preheating the kiln prior to operation and to supply heat as needed to maintain kiln temperature during operation. Typically, burner 4 is located well upstream of the point of ash removal. Although air in excess of the stoichiometric amount may be supplied to kiln 1, it is often advantageous to supply only enough air to allow efficient burn-out of carbon from the ash and to produce a fuel-rich gas for combustion in plug flow combustor 10. Fuel gas from kiln 1 flows to plug flow combustor 10 via lines 7 and 9. Fuel gas from line 7 is mixed in line 9 with air from line 8 to produce a fuel-air mixture having an adiabatic flame temperature of at least about 1400K and containing an amount of air in excess of the stoichiometric amount needed for complete combustion of the fuel values therein to yield carbon dioxide and water. Combustion products exit combustor 10 via line 11 to heat recovery system 12 and are vented via line 14. Any countercurrent flow solids combustor may be used in place of rotary kiln 1, as for example a moving grate (or belt) combustor or kiln. Typically, rotary kiln 1 includes means for removal of fly ash from the fuel gas entering line 7.

In the system of FIG. 2, gas turbine 40, which consists of power turbine 41, compressor 42 and drive shaft 44, is utilized to pressurize the system and to recover energy in the form of work. Air enters via line 12 and is compressed in turbine compressor 42. Compressed air from compressor 42 is fed to fluid bed incinerator 11 via line 16. Wastes from line 15 and limestone form line 14 are fed to incinerator 11 by injection into the compressed air in line 16. Ash is removed via line 17 from incinerator 11 which includes gas/solids separation means. Gaseous combustion products pass from incinerator 11 to plug flow combustor 20 via line 18. Optionally, compressed air from compressor 42 not needed for operation of incinerator 11 may be fed to line 18 via line 47. Combustion in plug flow combustor 20 is thermally stabilized by the heat of combustion in incinerator 11 which is operated such that the temperature of the gases entering plug flow combustor 20 is no lower than about 1300K. Gases from plug flow combustor 20 pass to power turbine 41 via line 19 and clean low pressure exhaust exits via line 46. Power turbine 41 drives turbine compressor 42 and generator 43 through drive shaft 44. This system is especially advantageous for disposal of chlorinated wastes and the like since the presence of limestone in the fluid bed removes acid combustion products such as hydrochloric acid and the like.

FIG. 3 depicts a dual fluidized bed incineration system which provides for more complete burn-out of carbon values in the solids for a given mean solids residence time. Backmixing of solids in a fluid bed combustor results a wide range of solids residence time and thus in by-passing of unburned solids just as backmixing in a gas phase combustor results in by-passing. Air and wastes enter fluid bed gasifier/combustor 21 via line 22. Typically, less than a stoichiometric amount of air is used to produce a fuel rich gaseous effluent which passes via line 28 to plug flow combustor 10. Inasmuch as gasification of wastes requires a shorter solids residence time than required for complete carbon burn-out, combustor 21 can be relatively small. Combusted solids from combustor 21 pass to secondary fluid bed combustor 31 via line 23. Combustion air from line 24 is injected into line 23 for completion of the combustion of the solids therein in combustor 31. To assure maximum burn-out of carbon values with minimum mean residence time, combustor 31 includes a plug flow reaction zone prior to a gas-solids separation section. Ash is drawn off via line 26 and combustion gases via line 25. Gases from line 25 are mixed with the effluent from combustor 21 in line 28. As needed to provide the desired amount of excess air, air is added from line 27 to the gases in line 28 prior to passage to plug flow combustor 10. Clean gases exit combustor 10 via line 29. This system is especially suited as a combustor for powering gas turbines in the manner of the system of FIG. 2.

Figure 4:
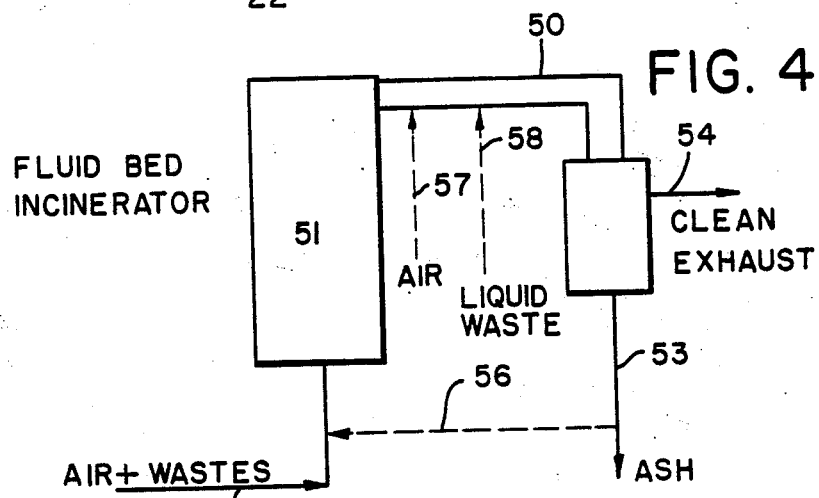
FIG. 4 is a schematic representation of a fluidized bed system employing a hot solids stabilized plug flow combustor.

FIG. 4 depicts another fluid bed incineration system employing a plug flow fluidized solids combustor. Air and wastes enter fluid bed incinerator 51 via line 52. Residence time of fluids in incinerator 51 is typically less than about 0.5 seconds, preferably less than about 0.1 seconds, and backmixing is sufficient to maintain combustion. Fluidized gas-solids effluent from incinerator 51 enter plug flow combustor/transfer line 50 where combustion continues to completion. Optionally, liquid wastes from line 58 may be injected into combustor 50 for combustion and additional air added via line 57. Combustion products from combustor 50 enter separator 55. Clean exhaust gas exits through line 54 and ash via line 53. Hot ash may be recycled to line 52 via line 56 to heat the incoming air/waste stream and thus reduce the amount of backmixing required in incinerator 51. As with the system of FIG. 2, the incinerator of FIG. 4 may be operated at an elevated pressure in conjunction with a gas turbine energy recovery system.

FIG. 5 is a cross-sectional side elevation of the embodiment plug flow combustor 20 shown in FIGS. 1-3, inclusive. The combustor 20 includes internally a stabilizing combustion catalyst 60. Representative of catalyst 60 is a metal honeycomb structure which may be sealed against by-passing gasses by attaching the catalyst 60 to a metal seal ring 62 fastened to the combustor 20 wall.

EXAMPLE 1

In a combustion system as schematically depicted in FIG. 1, toxic wastes are fed to the upper end of an inclined rotary kiln at the rate of about ten tons per hour using aa rotary screw feeder. Combustion air, in an amount equal to about 95% of the estimated stoichiometric amount is admitted to and ash removed from the opposite end of the kiln. To assure maximum removal of carbon values from the ash, a portion of the combustion air mixed with methane in the proper ratio to yield an admixture with an adiabatic flame temperature of about 1500K and the admixture combusted in a catalytically stabilized thermal (CST) combustor of my U.S. Pat. No. 3,928,961 prior entering the kiln. Sufficient methane is burned in the CST combustor to maintain the desired level of carbon burn-out from the ash exiting the kiln. Offgas from the kiln is mixed with sufficient air in excess of the stoichiometric amount needed for complete combustion such that the resulting admixture has an adiabatic flame temperature of about 1450K. This hot gas stream is then passed through a plug flow catalytically stabilized thermal combustor of sufficient size to provide a residence time of 20 milliseconds. Conversion of the toxic waste fuel is greater than 99.9999 percent. Heat is recovered from the hot combustion products by passing the combustion products to a steam boiler.

EXAMPLE II

Five tons per hour of pulverized solid wastes are slurried with oily wastes and pumped to a backmixed fluid bed incinerator/gasifier together with air in about 130% of the stoichiometric amount for complete combustion. Limestone is also fed to the bed in an amount sufficient for removal of the acid gases generated. Overflow from the bed is passed through a plug flow combustor of sufficient volume such that the residence time of the gases in the plug flow combustor is 100 milliseconds when the incinerator is operating at design capacity. Effluent from the plug flow combustor is passed to a multi-stage cyclone separator for removal of ash and spent limestone from the hot gases. Sufficient supplimentary fuel is added to the gaseous stream entering the plug flow combustor to maintain the adiabatic flame temperature of the gaseous stream at a value of at least 1350K. Advantageously, the air flow to the incinerator is pressurized by a gas turbine compressor driven by the clean incinerator off-gases.

EXAMPLE III

Two tons per hour of gasoline contaminated soil is fed to an externally heated kiln to heat the soil passing through the kiln to a temperature of about 400K. A flow of air is fed into the kiln counter-current to the flow of the contaminated soil in an amount sufficient to strip the gasoline from the soil. Gasoline laden air leaving the kiln is fed to the air inlet of a gas turbine and after compression is mixed with sufficient additional fuel to maintain the adiabatic flame temperature of the resulting admixture at a temperature of about 1550K. The admixture is passed into a catalytically stabilized thermal combustor and combusted. The clean combustion gases drive the turbine, recovering combustion energy in the form of useful power.

What is claimed is:

1. A method for the destruction of hazardous carbonaceous wastes comprising solids, which comprises;
    (a) gasifying said carbonaceous wastes and producing an intimate admixture of the gaseous products of said gasification with air, said admixture containing at least a stoichiometric amount of said air;
    (b) passing said admixture to a plug flow combustion zone, and
    (c) effecting sustained and essentially complete combustion of said admixture under essentially adiabatic conditions in the combustion zone to destroy said gaseous products and to form a heated combustion effluent; said combustion being characterized by said admixture having an adiabatic flame temperature such that the actual flame temperature in the combustion zone is greater than about 1350° K.;
    wherein combustion of said admixture is stabilized by mixing of said admixture with hot combustion products prior to passage to said plug flow combustion zone.

2. The method of operating a gas turbine which comprises;
    (a) gasifying carbonaceous wastes comprising solids and producing an intimate admixture of the gaseous products of said gasification with air, said admixture containing at least a stoichiometric amount of air,
    (b) passing said admixture to a plug flow combustion zone, and
    (c) effecting sustained and essentially complete combustion of said admixture under essentially adiabatic conditions in the combustion zone to destroy partial oxidation products and to form a combustion effluent of high thermal energy; said combustion being characterized by said admixture having an adiabatic flame temperature such that the actual flame temperature in the combustion zone is greater than about 1350° K. and (d) passing effluent from said combustion zone through a turbine to rotate said turbine; wherein said admixture is mixed with hot gas prior to said plug flow combustion zone.

3. The method of claim 12 wherein said hot gas comprises hot combustion product effluent and the temperature of said admixture mixed with hot gas is higher than the instantaneous auto-ignition temperature of said admixture.

4. The method of operating a gas turbine which comprises:

(a) gasifying carbonaceous wastes comprising solids and producing an intimate admixture of the gaseous products of said gasification with air, said admixture containing at least a stoichiometric amount of air, (b) passing said admixture to a plug flow combustion zone, and (c) effecting sustained and essentially complete combustion of said admixture under essentially adiabatic conditions in the combustion zone to destroy partial oxidation products and to form a combustion effluent of high thermal energy; said combustion being characterized by said admixture having an adiabatic flame temperature such that the actual flame temperature in the combustion zone is greater than about 1350° K. and (d) passing effluent from said combustion zone through a turbine to rotate said turbine; wherein said wastes comprises a chlorinated carbonaceous compound admixed with at least 25 percent by weight of a hydrogen containing fuel.

5. The method of operating a gas turbine which comprises;

(a) gasifying carbonaceous wastes comprising solids and producing an intimate admixture of the gaseous products of said gasification with air, said admixture containing at least a stoichiometric amount of air, (b) passing said admixture to a plug flow combustion zone, and (c) effecting sustained and essentially complete combustion of said admixture under essentially adiabatic conditions in the combustion zone to destroy partial oxidation products and to form a combustion effluent of high thermal energy; said combustion being characterized by said admixture having an adiabatic flame temperature such that the actual flame temperature in the combustion zone is greater than about 1350° K. and (d) passing effluent from said combustion zone through a turbine to rotate said turbine; wherein said admixture comprises a halogenated compound and said admixture passed to said plug flow combustion zone contains at least one mole of water per mole of halogen.

* * * * *